March 26, 1929.  K. R. PLATT  1,707,175
DIRIGIBLE SPOTLIGHT AND TRAFFIC SIGNAL
Filed March 5, 1927    2 Sheets-Sheet 1
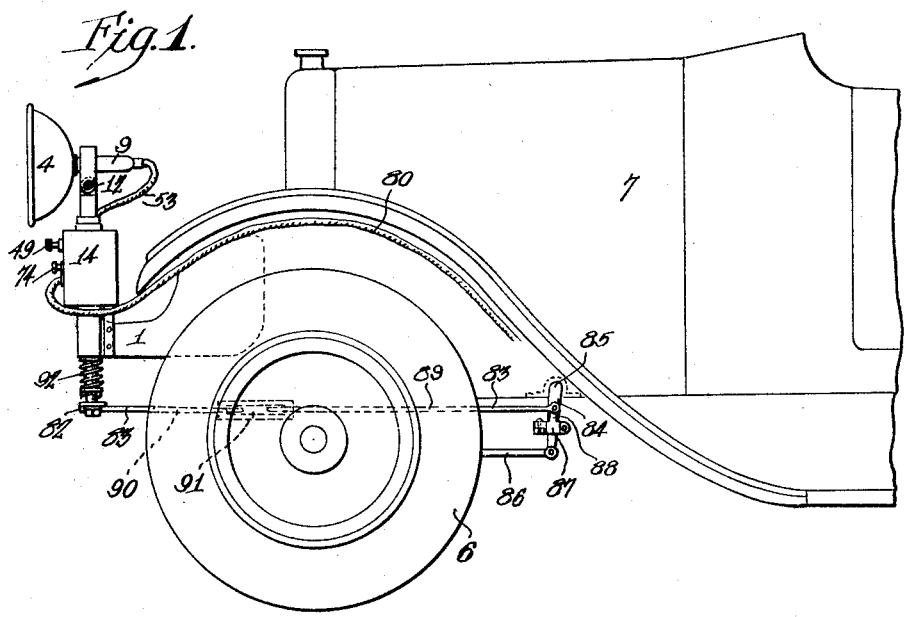
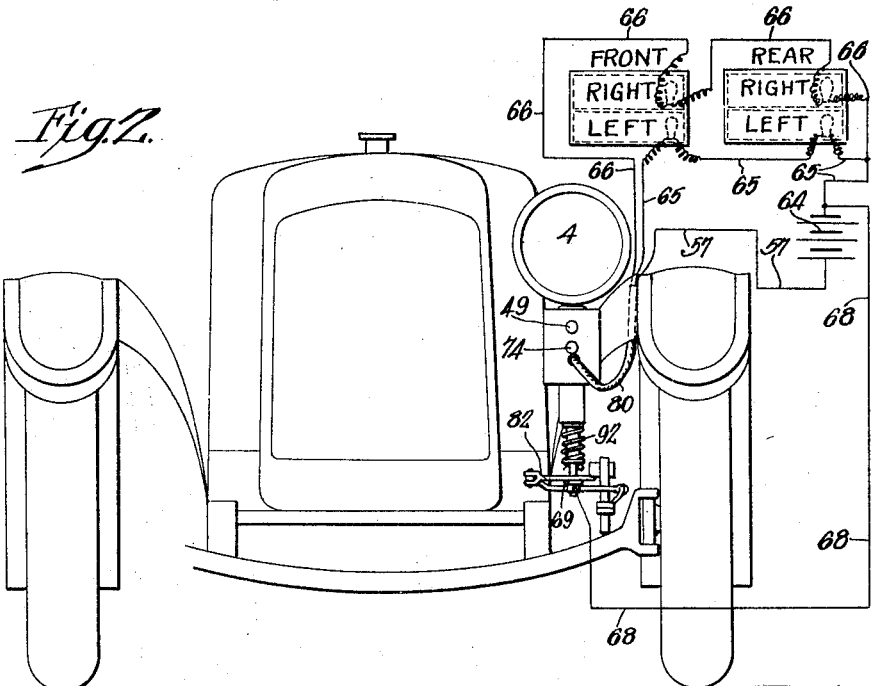

March 26, 1929.  K. R. PLATT  1,707,175
DIRIGIBLE SPOTLIGHT AND TRAFFIC SIGNAL
Filed March 5, 1927  2 Sheets-Sheet 2
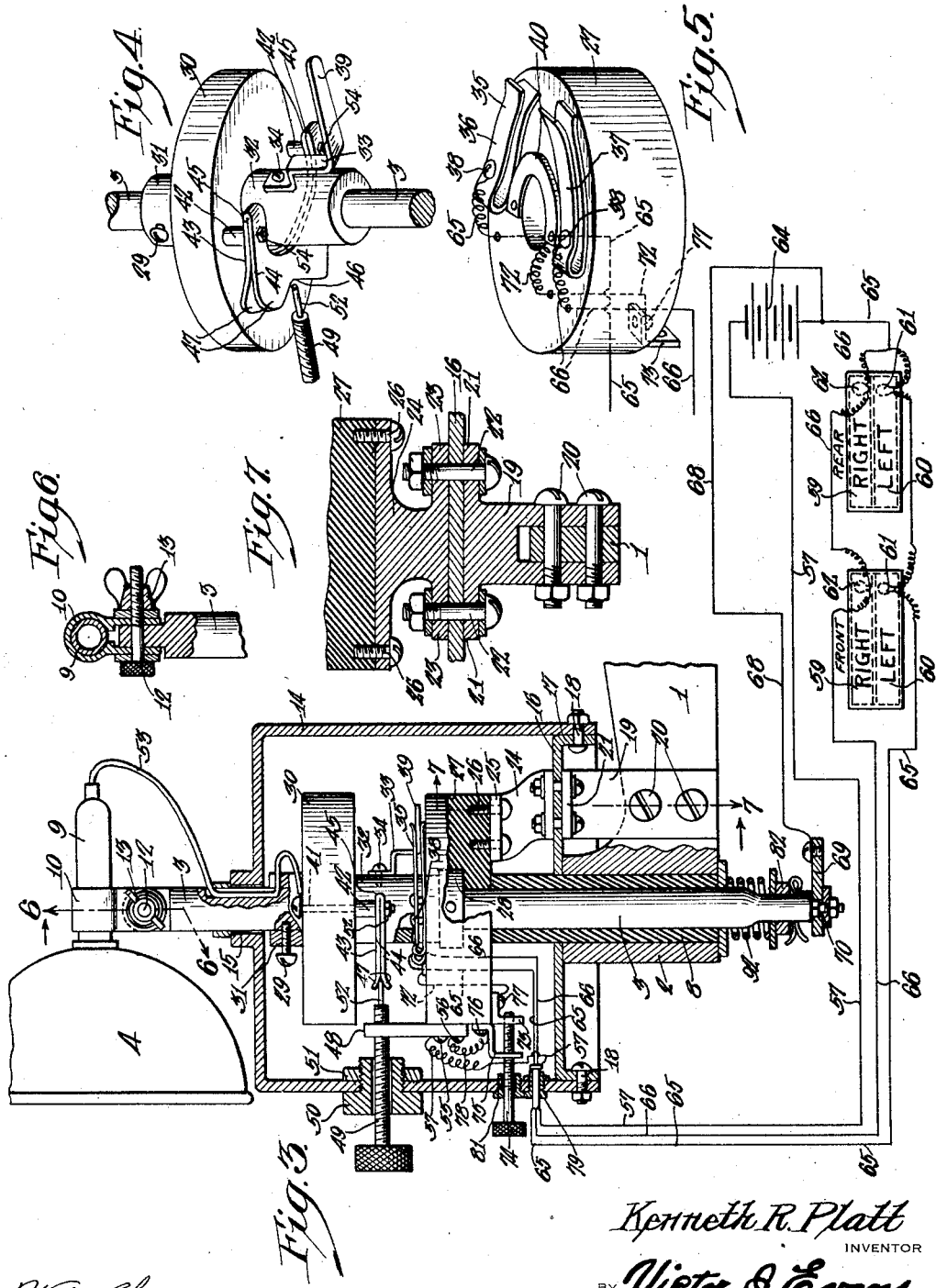
Kenneth R. Platt
INVENTOR
BY Victor J. Evans
ATTORNEY
WITNESS:

Patented Mar. 26, 1929.

1,707,175

UNITED STATES PATENT OFFICE.

KENNETH R. PLATT, OF WISSAHICKON, PHILADELPHIA, PENNSYLVANIA; IRENE L. PLATT ADMINISTRATRIX OF THE ESTATE OF SAID KENNETH R. PLATT, DECEASED.

DIRIGIBLE SPOTLIGHT AND TRAFFIC SIGNAL.

Application filed March 5, 1927. Serial No. 173,135.

The present invention relates to an improved dirigible spot light including means operatively associated with traffic signals, to aid in the safety of pedestrians and the automobile driver, in the night as well as in the day.

As is well understood, the headlights on all automobiles are attached permanently to the body of the vehicle, therefore, swing around with the body, in which case the light rays are not directed with the travel of the wheels, hence the purpose of the present invention is to provide an improved dirigible spot light, from which a light beam may travel in a direction corresponding with that traversed by the front wheels of the vehicle, thereby permitting the driver to observe the pits and embankments on both sides of the roadway.

Spot lights have been heretofore used, but they are usually hand operated. In other words the attention of the driver is partly taken from the steering wheel in order to manipulate the now used spot light. In the present invention it is the aim to locate the spot light on the front of the car, preferably on the mud guard over one of the front wheels, and through improved means operatively connecting with the steering mechanism of the automobile, it is possible to operate the spot light automatically. For instance, as the steering wheel is turned in one direction or the other the spot light correspondingly turns.

Another purpose is to provide right and left traffic signals on the forward and rear end of the automobile, and through the medium of electrical means operatively associated with parts of the spot light mechanism, it is possible to operate these signals automatically, as for instance when the steering wheel is turned in one direction or the other, one or the other of the signals will indicate the direction of travel of the forward wheels of the automobile.

Another very particular feature of the present invention is the fact that the operative connections between the spot light mechanism and the traffic signals includes a device, which is so constructed as to avoid operating the signals, unless the automobile is actually making a right or a left turn. In other words, this operative means between the spot light and the signals is so constructed as to prevent the signals from operating during the lateral vibrations of the front wheels, or when the front wheels are merely turning in one direction or the other to avoid bad places in the roadway or to avoid an oncoming automobile.

An advantage of the present invention resides in the fact that in case the headlights are bright, and the driver desires that the spot lamp should light up only on a curve, it is possible to adjust a switch, which will cause the current to pick up and light the right and left signals, when the light beam from the spot light is directed a substantial distance to each side of the roadway. Also the spot lamp, though it can be lighted up on a straight road, it will not be customary to make the adjustments of the operative connections between the spot lamp and the signals. In order to keep the spot lamp lighted when traveling straight ahead. It is essential to allow a given amount of play of the steering apparatus, in order to hold the road.

However, should the headlights be dim and should the driver desire a bright beam to be thrown in the centre of the road, it is possible to adjust the spot light in order to be lighted at all times, in which case the light beam will follow the course traversed by the front wheels. In fact the light beam will respond to every lateral vibration of the front wheels. Furthermore, the spot lights can be focused high for overland driving, or low upon the road as is required by the law in various States, and as the spot light is automatically actuated with the operation of the steering mechanism, it serves a great aid to the driver in turning into dark streets and lanes and in making abrupt curves on highways, as the beam of light always follows the direction of the front wheels.

Still another purpose of the invention is the provision of an improved circuit controlling device mounted in a housing which supports the spot light, which is particularly adapted for use in connection with the present invention, in order that the spot lamp may be lighted at all times, or at predetermined periods, according to the turn of the front wheels, and to correspondingly light up the right and left signals.

Furthermore, it is the aim to provide an improved simple and very compact construction, and one which is applicable to all makes of automobiles, without altering their construction and without marring any part thereof.

A still further purpose is the provision of a housing for the circuit control, thereby rendering the circuit control weatherproof, as well as preventing any short circuiting.

It is to be understood that the particulars herein given are in no way limitive, and that while still keeping within the scope of the invention, any desired modification of details and proportions may be made in the construction of the device according to circumstances.

The invention comprises further features and combination of parts to be hereinafter set forth, shown in the drawings and claimed.

In the drawings:

Figure 1 is a view in side elevation of the forward part of an automobile, showing the improved dirigible spot light mechanism applied, showing its connections with a traffic signal.

Figure 2 is a view in front elevation of an automobile of conventional type, showing the right and left traffic signals diagrammatically in conjunction with the spot light.

Figure 3 is a vertical sectional view through the housed circuit control mechanism for the spot light, showing the detail features thereof.

Figure 4 is a perspective view of a movable member of said circuit control mechanism, which shows a device for pre-determining the lighting of the right and left signals.

Figure 5 is a detail perspective view of a stationary member of said circuit control mechanism. Figure 6 is a sectional view on line 6—6 of Figure 3.

Figure 7 is a sectional view on line 7—7 of Figure 3.

Referring to the drawings: 1 identifies a bracket including a bearing 2 for the support of a shaft 3, which in turn operatively carries a spot lamp 4. While this bracket is shown as attached to the mud guard or fender 5 over one of the front wheels 6 of an approved type of automobile 7, it is to be understood that it may be attached to any other convenient part of the machine. The bearing carries a relatively hard insulating bushing 8 through which the shaft or spot light stem rotatably passes. The casing of the spot light has a rearwardly extending projection 9 which is mounted in suitable manner in a split sleeve or bearing 10, and this sleeve or bearing is provided with a pair of ears 11 through which a bolt 12 passes for mounting the sleeve on the end of the shaft or spindle 3. The ears 11 straddle the end of the shaft or spindle, there being a thumb nut 13 on the bolt 12 for tightening the ears to not only clamp the split sleeve tight to the projection 9, but also clamp the ears to opposite sides of the extremity of the spindle or shaft, to hold the spot lamp in position, with sufficient rigidity to prevent displacement thereof as a result of the vibrations of the body of the automobile. While a particular construction has been described for the support of the spot lamp, that is to the spindle, it is obvious that any other similar construction may be employed.

The spindle or shaft passes through a housing or casing 14, the construction and arrangement of which may vary according to circumstances arising in the manufacture of the device as well as in applying the construction to various makes of automobiles. However, the casing or housing is closed at its top, with the exception of a flanged opening 15, and the bottom of the housing is open, though it is closed by a removable bottom plate 16. This plate is annularly flanged as at 17, the flange being bolted at 18 to the wall of the housing or casing.

As previously stated the bushing 8 is relatively hard and heavy though it is constructed of insulating material and provides a substantially long bearing for the shaft or spindle, hence assisting materially in affording rigidity for the shaft as well as assisting in providing rigidity for the housing or casing.

To further assist in providing rigidity for the housing an auxiliary bracket 19 is fastened at 20 in any approved way, and its upper end has lateral pieces or lugs 21, which are secured to the bottom 16 by means of bolts 22. The bolts 22 also pass through lateral portions 23 of a T-shaped support 24. This support in turn has lateral portions 25 at its upper end similar to the portions 23, and to which, by means of bolts 26 a circular base 27 is secured. This base is constructed of relatively hard insulating material of any approved make, and its rigidity is insured by the support 24 and due to the fact that the spindle or shaft passes through it, the shaft or spindle also passing through the flanged opening 15 of the top of the housing. This also insures additional rigidity to withstand the vibrations of the body of the automobile. The spindle or shaft has an integral collar 28 which is in a bearing of the base 27. The fact that the bottom 16 is bolted within the housing or casing and that it is bolted to the auxiliary bracket 19 and the support 24, the entire structure of the casing and the spot lamp, due to this construction is stabilized in position and against vibrations of the body of the automobile.

Secured on the spindle or shaft 3 by means of a set-screw 29 (which partly enters the spindle or shaft), though other approved devices may be used, is a disc or plate 30. The set-screw passes through an extension sleeve or collar 31 of the plate or disc and holds the latter securely in position against relative movement to the shaft or spindle. The under face of the plate or disc 30 has a central extension collar 32. The plate or disc 30 and its collars 31 and 32 are constructed of any suitable insulating material, and movable with the lower collar is a movable contact 33. The fact is this contact is angular in formation and is secured to the lower collar 31 as at 34.

The movable contact 33 is adapted to cooperate with and engage between the opposed blades 35 of the stationary contacts or conductors 36 and 37. These conductors or contacts 36 and 37 are secured at 38 to the insulating base 27. The collar 32 partly enters the central portion of the base 27, and it will be noted that the conductors or contacts 36 and 37 have the ends of their blades spaced respectively. In other words the blades of the conductor or contact 36 are spaced from the extremities of the blades of the conductor or contact 37, it being noted that the angular contact 33 is positioned between the extremities of the conductors or contacts 36 and 37. When a lateral or horizontal arm 39 engages between the blades of the conductor 36, the left hand traffic signal lamp will light, and when the horizontal arm 39 passes between the blades of the conductor or contact 37, the right hand traffic signal lamp will light and the left hand signal lamp will extinguish. A semi-circular contact 40 is also carried by the stationary plate or base 27, and with which the arm 39 of the movable contact engages.

Passing through the plate or disc 30 are bolts 41, which are positioned diametrically, and mounted on the lower portions of the bolts are sleeves 42, though another approved types of construction may be used, a conductor 43 is mounted upon the plate or base 30. This conductor, while it may be of any contour, is preferably semi-circular and comprises opposed blades 44. The fact is the bolts 41 pass through the blades, where they are folded. For instance, to construct the conductor 43, a circular ring plate is first made, then it is bent or folded upon itself as at 45, which provides the opposed blades 44.

The blades at points intermediate their folds have their edges V-shaped. For instance, these blades are recessed in V-shaped formation as shown at 46, and the opposed blades at these points are bent upwardly and downwardly providing flared parts as at 47. A contact screw or conductor is operatively supported in a bearing 48 which rises from and is secured to the disc or base plate 27. The body of the contact screw 49 passes through a bushing or sleeve 50 which is threaded through the wall of the housing or casing 14, there being a lock nut 51 to hold the same in position. This bushing or sleeve may be constructed of any suitable insulating material to avoid short circuiting.

The contact screw 49 has a reduced extremity 52, which when the light shaft extends straight ahead, the front wheels traveling substantially straight ahead, normally lies in the crotches of the recess or cut-away portions 46, in which case the spot lamp remains extinguished.

It will be noted that by adjusting the contact screw 49 the reduced extremity 52 may engage constantly between the upwardly and downwardly flared or deflected portion 47 of the conductor 43, in which case the spot lamp will remain constantly lighted while the front wheels are traveling straight ahead, and it will be noted that when the front wheels turn to the right and left the light shaft will follow the direction of the wheels. However when the extremity of the contact screw 49 is a short distance from the crotch of the recess 46 the spot lamp remains extinguished, but as the spot lamp turns to correspond with the front wheels, the reduced extremity will engage between the blades of the conductor 43 and pick up the lighting of the spot lamp at predetermined periods. The greater the screw 49 is adjusted outwardly, the greater the period between the turn to the left and the turn to the right before the spot lamp is lighted.

As it is well understood the bulb (not shown) in the spot lamp has one side of its line grounded with the spindle or shaft, that is through the medium of the casing of the spot lamp, the other side of the line of the bulb electrically connects with an insulated wire 53, which in turn connects with one of the screws 41, which acts as a binding post. There are two screws 41 and two sleeves 42, the screws having nuts 54 to hold them in place. These screws, as previously stated, support the conductor 43.

The bearing 48 rises from and is secured in any approved manner, preferably by binding screws 55 and 56 to the base or disc 27, which is stationary, and connected to the binding screw 55 is a lead 57 which in turn electrically connects with a battery 64 which in turn is connected to a right and left traffic signal by wires or leads 65 and 66. In other words this right and left traffic signal is in the form of an approved type of casing with a front plate with the words "Right" and "Left" 59 and 60 cut therein. The front plate may be any substantial transparent material colored a deep red, half of its height, particularly that half with the word "Left" cut therein. However, that portion of the transparent front plate which has the word "Left" may be left plain, thereby avoiding cutting the word out, but the remainder of the lower half of the front plate may be colored red. In this way the light from the bulb will show through and permit the word to be clearly discernible to those watching the signal.

The upper half of the front plate is colored a deep bluish green, excepting a portion which may be covered by the word "Right", which portion may be left plain, or may be cut out. The interior of the casing of the traffic signal may be divided into upper and lower compartments, the upper compartment carrying a bulb 62, the lower compartment carrying a bulb 61. When the bulb 62 is lighted the light will appear through the word "Right", and when the bulb 61 is lighted the word "Left" will be discernible, indicating whether or not the chauffeur of the automobile is about to turn to the right or the left. The fact is leads or wires 65 and 66 connect with the bulbs 62 and 61 of the traffic signal. The wire or lead 65 beyond the bulb 61 extends and is in turn connected to a binding screw 38 of the conductor or contact 36, while the wire or lead 66 connects a binding screw 38 of the conductor or contact 37. This lead 66 is in turn passed through the base or disc 27, it being obvious by referring to Figures 1 and 2, there may be, as shown, front and rear traffic signals, rendering it possible for those in front as well as those in the rear to know whether or not the automobile may turn to the right or the left. The battery 64 is in turn connected by a wire or lead 68 to an arm 69, which may be fastened in an approved way as at 70 to the lower end of the spindle or shaft 3. Connected to the contact 40 (which is semi-circular) as at 71 in any approved way is a wire or lead 72, which in turn is connected to a contact plate 73, which acts as a bracket for a screw 74. This screw 74 constitutes a switch member, and is threaded through an angle plate or conductor 75. The angle plate or conductor as well as the bracket or contact plate 73 are connected to the base or disc 27 by binding screws 76 and 77. The fact is the wire or lead 72 is fastened under the binding screw 77, while a wire or lead 78 is fastened under the binding screw 76, said wire 78 being in turn connected to the binding screw 56.

As previously stated the screw 74 acts as a switch member, and passes through an insulating bushing 79, which is threaded through the wall of the housing or casing 14. It is obvious that when the screw switch 74 is turned so as to disengage from the contact plate 73, the traffic signal may be cut out of the circuit, but as long as the screw switch is in contact with the plate 73, the traffic signal will light and indicate the direction of travel when the spot lamp is lighted.

The wires or leads 57, 65 and 66 may be encased, though not necessarily, in an approved type of cable 80, for instance such cable as BX, though it is possible to use any other form of cable. However, this cable may pass from the casing or housing and fasten in any approved manner to the mud guard, or any other part of the automobile, especially where it is not very noticeable, thereby protecting the wires from the weather. The wire 68 may also be encased in a suitable cable and connected in any approved way, not shown, to the body of the automobile or otherwise. The cable 80, at a point where its wires are to connect to the various parts on the interior of the housing or casing 14, passes through a suitable insulating bushing 81.

The bushing 50 is constructed from any suitable insulating material, thereby insulating the screw 49 from the housing or casing 14.

The wire or lead 53 may be encased in a cable, though it is insulated, and if not encased in a cable it may be connected to one of the screws 41 in any manner, so as to prevent the insulation from hardening and then cracking or peeling off. In other words, the lead or wire 53 may enter the housing or casing 14 in any convenient manner according to circumstances when adapting this improved dirigible spot lamp and traffic signal apparatus to practice. It is possible, as shown in Figure 1, to permit the wire or cable 53 to pass through the wall of the housing or casing 14 in the manner shown, or it may enter said casing by passing through an opening constructed through the spindle or shaft 3, thereby avoiding the wire or cable 53 from moving relatively to the spindle 3. Such movement would cause the insulation to crack, especially due to the insulation being exposed to the weather, which would no doubt cause a short circuit.

In the operation the spindle or shaft 3 at its lower end is provided with an arm 82 which is connected by means of a rod 83 to a down-turned arm 84 of a rocking shaft 85 of the steering mechanism. The fact is the arm 84 is in turn connected in an approved manner to the front wheels through the medium of a connecting rod 86. The connection of the rod 83 to the arm 84 is accomplished by means of clamping plates 87, an arm 88 rising from one of the clamping plates in order to accommodate the connection of the rod 83. The rod 83 consists of two sections 89 and 90, which are operatively connected by means of a turnbuckle 91 of an approved type. By a sectional rod 83 it is possible to adjust the dirigible spot light mechanism to automobiles of different makes.

While the control connections between the steering mechanism of the automobile and the spot lamp are accomplished through the medium of an arm 84 of a rock shaft 85, it is to be understood that the rod 83 may connect in any approved way with a steering mechanism of a Ford automobile. A suitable spring 92 is interposed between a washer at the lower end of the bushing 8 and a washer which is adjacent the arm 82, so that the shaft or spindle 3 will rotate in a corresponding direction with the front wheels when the latter are turned.

Current leaves the battery 64 over the wire 65 and through the bulb 61 to the binding screw 38 of the conductor 36, then over the contact arm 33 to the plate 40 and the wire or lead 72 to the contact plate 73. The current will pass through the screw switch 74 to the conductor plate 75 over the wire or lead 78 and to the conductor 43 to the screw 41 to the lead or wire 53 and cause the spot lamp to light, the current passing through the spindle or shaft 3 back to the battery over the wire 68. The current in passing over the wire or lead 78 passes over the bearing 48, then over the lead 57 and back to the battery 64, indicating that it is the intention of the driver to turn to the left. The driver in turning to the left imparts movement to the rod 83 and rotates the spindle or shaft 3, so that the conductor 43 will engage with the reduced portion 52 of the screw 49 also in turning to the left, the spindle or shaft rotating in the proper direction moves the contact plate 33 between the blades 35 of the conductor 36, so as to permit the current to pass from the conductor 36 to the contact plate 40 and then to the wire or lead 72.

The driver in turning to the right, will impart the proper movement to the rod 83 and rotate the spindle or shaft 3 so as to turn the spot light to the right, in which case the contact 33 will move until its arm 39 will engage between the blades 35 of the conductor 37, in which case current will leave the battery 64 and over the wires 65 and 66, lighting the bulb 62 of the right hand traffic signal, the current continuing over the wire 66 to a binding screw or post 38, to the conductor 37, over the contact 33 to the conductor plate 40, over the lead 72 to the contact plate 73. The current continues from the contact plate 73 over the screw switch 74 and the plate 75 to the bearing 48 by way of the wire 78. The current divides at this point, part of it passing from the screw 49 over the conductor 43 to the screw 41 and the lead 53 to the spot lamp, then over the spindle or shaft 3 and back to the battery over the wire or lead 68. The other part of the current leaves the bearing 48 over the wire 57 and returns to the battery 64, thereby causing the bulb 62 of the right hand traffic signal to be lighted, indicating the intention of the driver to turn to the right.

It is obvious that the screw switch may be adjusted so that its terminal will disengage from the contact plate 73, in which case the traffic signals are cut out of the circuit. When the screw switch is so adjusted the spot lamp will light without lighting the traffic signals. While this operation may be accomplished for use in the day time, it is to be understood that the signals may be used in the day as well as at night.

It is obvious that the invention is not to be confined to the exact wiring as disclosed, as it may be found essential to arrange the wiring as to use the frame of the automobile as a conductor, or the wiring may be otherwise arranged, just so long as the herein disclosed result is attained, namely, that the spot lamp may be lighted at variable points relative to the turning of the front wheels of the automobile, and that when the wheels are turned the right or left traffic signals may be lighted, it also being assured that the wiring will be such as to permit the traffic signals to be cut out of the circuit, and thereby permit the spot lamp to light individually.

It is to be noted that the turnbuckle 91 or the clamping plate 87 may be adjusted for the purpose of regulating the stroke of the spot lamp, or rather regulate the rocking movement of the spindle or shaft 3, and thereby govern the engagement of the extension 52 between the blades of the conductor 43.

The invention having been set forth, what is claimed is:

1. In an appliance for the purpose indicated, the combination with an electric circuit including a spot lamp in the circuit, of a rockable member carrying the spot lamp and being in turn operatively connected with the steering mechanism of an automobile, a device including a member and a movable element movable with the spindle and included in the circuit and co-operable with the member for controlling the circuit at variable periods and causing the lamp to light at variable pre-determined points to the right or the left, said member being adjustable longitudinally so as to remain in contact with the movable element to retain the lamp lighted continuously.

2. In an appliance for the purpose indicated, the combination with an electric circuit including a spot lamp in the circuit, of means carrying the spot lamp and in turn operatively connecting with the steering mechanism of an automobile to operate correspondingly, and electro mechanical mechanism in the circuit and operatively associated with the means for controlling the circuit at variable periods and causing the lamp to light at variable predetermined points to the right or the left, and means adjustably operable to retain the lamp lighted continuously.

3. In an appliance for the purpose indicated, the combination with an electric circuit including a spot lamp in the circuit, of a casing provided with means fixedly supporting it on a vehicle, said casing having a bearing mounted vertically therein, of a rockable member carrying said spot lamp above the casing, said rockable member extending below and beyond the bearing and having its lower end operatively connected with the steering mechanism of the vehicle, a plate of insulating material rotatable with the rockable member and located within the casing and provided with an extension resting on a part of said bearing, a segmental conductor carried by and projecting below the bottom face of said plate and having a semi-circular portion straddling the reduced part of the plate, said conductor comprising opposed yieldable blades, the conductor being in said circuit, said blade being V-shaped opposite said semicircular portion, a support rising from the bearing within the casing, and a device operative in the support and projecting through the wall of the casing at one end, and its other end having a reduced extension operable between the blades at variable positions or continuously to control the circuit at variable periods or cause the lamp to light continuously.

4. In an appliance for the purpose indicated, the combination with an electric circuit including a spot lamp in the circuit, a casing, of a rockable member operative in a bearing in the casing and being in turn operatively connected with the steering mechanism of an automobile, a support on said bearing, an insulating plate movable with the rockable member, a segmental conductor carried below and by the plate and having opposed yieldable blades, the adjacent edges of which having corresponding V-shaped crotches, said blades being partly divergent and the conductor being in said circuit, and a device operatively adjustable in said support and having a reduced extension positioned opposite the corresponding crotches, said device projecting through and beyond the casing and adapted to be manually operated to adjust the device to project the extension toward and from the crotches, whereby as the rockable member operates, the conductor may oscillate to the right or the left, whereby the extension may engage between the blades at variable points or continuously with the blades, so as to light the lamp at variable periods or continuously.

In testimony whereof he affixes his signature hereto.

KENNETH R. PLATT.